United States Patent
Gunn, III et al.

(10) Patent No.: US 7,162,124 B1
(45) Date of Patent: Jan. 9, 2007

(54) FIBER TO CHIP COUPLER

(75) Inventors: Lawrence C. Gunn, III, Encinitas, CA (US); Thierry J. Pinguet, Cardif-By-The-Sea, CA (US); Maxime J. Rattier, Paris (FR); Zhen-Li Ji, Pasadena, CA (US); Jeremy Witzens, Pasadena, CA (US)

(73) Assignee: Luxtera, Inc., Carlsbad, CA (US)

( * ) Notice: Subject to any disclaimer, the term of this patent is extended or adjusted under 35 U.S.C. 154(b) by 59 days.

(21) Appl. No.: 10/799,040

(22) Filed: Mar. 11, 2004

Related U.S. Application Data

(60) Provisional application No. 60/454,870, filed on Mar. 14, 2003.

(51) Int. Cl.
*G02B 6/34* (2006.01)
*G02B 6/26* (2006.01)

(52) U.S. Cl. .............................. 385/37; 385/27; 385/50

(58) Field of Classification Search .................. 385/37
See application file for complete search history.

(56) References Cited

U.S. PATENT DOCUMENTS

| | | | | |
|---|---|---|---|---|
| 5,488,681 | A * | 1/1996 | Deacon et al. | 385/37 |
| 5,657,407 | A * | 8/1997 | Li et al. | 385/37 |
| 5,724,463 | A * | 3/1998 | Deacon et al. | 385/27 |
| 6,136,611 | A * | 10/2000 | Saaski et al. | 436/527 |
| 6,289,144 | B1 * | 9/2001 | Neuschafer et al. | 385/12 |
| 6,697,411 | B1 * | 2/2004 | Hoose et al. | 372/92 |
| 2002/0106156 | A1 * | 8/2002 | Vail et al. | 385/37 |
| 2002/0146054 | A1 * | 10/2002 | Hoose et al. | 372/92 |
| 2003/0010904 | A1 * | 1/2003 | Luo | 250/227.11 |
| 2003/0081902 | A1 * | 5/2003 | Blauvelt et al. | 385/50 |
| 2004/0202428 | A1 * | 10/2004 | Hwang et al. | 385/49 |
| 2004/0240788 | A1 * | 12/2004 | Zheng et al. | 385/37 |

OTHER PUBLICATIONS

Hartman, et al., An Effective Lateral Fiber-Optic Electronic Coupling and Packaging Technique Suitable for VHSIC Applications, Journal of Lightwave Technology, vol. LT-4, No. 1, Jan. 1986, pp. 73-82.
Tocci, et al., Optical Interconnection (Boston, Artech House, 1994), pp. 244-252.

* cited by examiner

*Primary Examiner*—Frank G. Font
*Assistant Examiner*—Mary El-Shammaa
(74) *Attorney, Agent, or Firm*—Fernandez & Associates

(57) ABSTRACT

A fiber to chip coupling connecting an optical fiber to an integrated circuit. A section of fiber is laid on top of the surface of the chip, where the end of the fiber has been cut at an angle to form an angled tip. The angled tip has a flat surface which reflects light down to a waveguide grating coupler disposed on the integrated circuit. Light is reflected off the reflective surface of the angled tip by total internal reflection. The waveguide grating coupler is designed to accept the slightly diverging light beam from the reflective surface of the angled tip of the fiber. Light can also propagate through the fiber to chip coupler in the opposite direction, up from the substrate through the waveguide grating and into an optical fiber after bouncing off the reflective surface of the angled tip.

39 Claims, 4 Drawing Sheets

FIBER TO CHIP COUPLER

CROSS-REFERENCE TO RELATED APPLICATIONS

This application claims priority from U.S. Provisional application No. 60/454,870 filed Mar. 14, 2003.

FIELD OF THE INVENTION

The present invention relates to an apparatus for connecting an optical fiber to a substrate and a method for fabricating the apparatus.

BACKGROUND OF THE INVENTION

Modern communications systems based on optical fibers require massive data handling at both ends of the fiber at ever increasing speeds and ever decreasing costs. This data handling requires both optical systems such as wavelength division multiplexing (WDM) and electronic systems. The devices used to perform these tasks are high speed electronic chips and optical devices. The integration of optical devices of typically dozens of devices per chip is not as well advanced as the integration of electronic devices, where millions of devices can be disposed per chip. High optical losses within optical devices prevent the cascading of such devices and results in a small number of devices on a chip. The difficulties inherent in wavelength scale fabrication of optical devices results in low yields and high costs.

Connecting optical fiber to integrated circuits can be accomplished through various types of butt connections to the edge or surface of an integrated circuit. The butt of a fiber can be connected to a planar waveguide at the edge of an integrated circuit, but this technique is most useful if the cross sectional areas of the fiber core and the waveguide are of similar size. An optical fiber with a larger cross sectional area can be connected to a waveguide with a much smaller cross sectional area if the butt of the fiber is connected to a diffraction grating, such as a waveguide grating coupler disposed on the integrated circuit. The waveguide output of the waveguide grating coupler can be reduced to a desired smaller cross sectional area through a spot size reducer. But the packaging of such integrated circuits with optical fibers connected at roughly right angles to the surface of the integrated circuit is not very practical, since such configurations waste a great deal of space and are easy to break or damage.

One of the key achievements needed to improve the integration of optical devices is to efficiently couple light from an optical fiber to an integrated circuit and vice versa.

SUMMARY OF THE INVENTION

A fiber to chip coupling connecting an optical fiber to an integrated circuit. A section of fiber is laid on top of the surface of the chip, where the end of the fiber has been cut at an angle to form an angled tip. The angled tip has a flat surface which reflects light down to a waveguide grating coupler disposed on the integrated circuit. Light is reflected off the reflective surface of the angled tip by total internal reflection. The waveguide grating coupler is designed to accept the slightly diverging light beam from the reflective surface of the angled tip of the fiber. Light can also propagate through the fiber to chip coupler in the opposite direction, up from the substrate through the waveguide grating and into an optical fiber after bouncing off the reflective surface of the angled tip.

DETAILED DESCRIPTION

Figure 1:
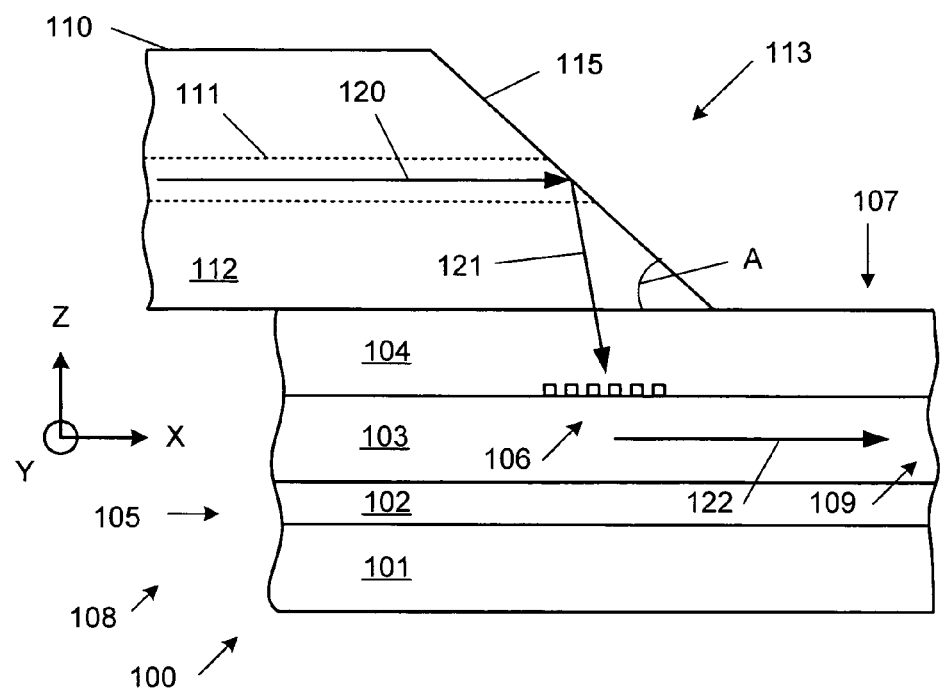
FIG. 1 is a side view of a fiber to chip coupler, according to one embodiment of the present invention.

FIG. 1 is a side view of a fiber to chip coupler, according to one embodiment of the present invention. Fiber to chip coupler (FTCC) 100 is made of optical fiber 110 positioned on the surface 107 of integrated circuit (chip). Integrated circuit 108 is made of substrate 105 and cladding layers 104. Substrate 105 is made of layers 101, 102 and 103. In a preferred embodiment, substrate 105 is a SOI (silicon on insulator) substrate, typically used in the fabrication of CMOS integrated circuits. If substrate 105 is a SOI substrate, then layers 101 and 103 are made of silicon and layer 102 is an insulator, typically silicon dioxide. The present invention can be fabricated with substrates of various kinds, not just silicon based ones.

Optical fiber 110 is made of core 111 and cladding 112 and has been cut at an angle A with respect to the core of the fiber. Cutting fiber 110, typically at an angle less than 45 degrees, has formed flat surface 115. An angle of less than 45 degrees is preferred in order to minimize reflections back to surface 115 from the surface 107 of chip 108. Light 120 propagating down fiber 110 will reflect off of surface 115 and then propagate as light 121 down into chip 108.

Surface 115 at the fiber to air interface forms a reflective surface, which can provide total or substantially total internal reflection of light 120 out of the fiber 110 and into chip 108. Light 121 reflected by surface 115 enters into chip 108 and is connected to planar waveguide 109 by waveguide grating coupler 106. Surface 115 of angled tip 113 is perpendicular to the x-z plane and the longer side of the angled tip 113 is in contact with the surface 107, so that light 121 is in the x-z plane. The formation of the angled tip can be achieved by polishing or laser cleaving.

The angled end surface 115 of the fiber 110 can be metallized, by coating it with a metal such as aluminum, thus forming a mirror on surface 115. A mirror on surface 115 may provide better reflection of the light 120 as compared to the internal reflection provided by the fiber to air interface at surface 115. The angled end surface can also be coated with a dielectric layer or a stack of dielectric layers, with a refractive index sufficiently different from that of the optical fiber, so as not to diminish the total internal reflection occurring at the angled tip.

Some examples of waveguide grating couplers are discussed in U.S. provisional patent application No. 60/446,842 entitled "Optical Waveguide Grating Coupler" filed on Feb. 11, 2003, and U.S. patent applications entitled "Optical Waveguide Grating Coupler," "Optical Waveguide Grating Coupler with Scattering Elements of Various Configurations" and "Optical Waveguide Grating Coupler Incorporating Reflective Optical Elements and Anti-reflective Elements" filed on Feb. 11, 2004, which are incorporated herein by reference.

Various types of optical fiber can be used and a preferred type is a single mode fiber (SMF), which can for example, have a cladding diameter of 125 microns or in some SMF fibers, a reduced diameter of 80 microns.

A polarization maintaining fiber (PMF) can be used to control the polarization of light in the fiber, with for example, a selected polarization of operation with the electric field oriented along the y axis. With the angled tip 113 cut as shown in FIG. 1, this allows the selected polarization to reflect off surface 115 and conserve its polarization along the y axis, as compared to light coming down fiber 110 with polarization along the z axis, which would result in such a polarization being changed as it reflects off surface 115.

Apparatus 100 also operates in the reverse direction, so that light 122 from waveguide 109 that enters waveguide grating coupler 106 will be directed up towards surface 115 and then reflected into the core of fiber 110.

Figure 2:
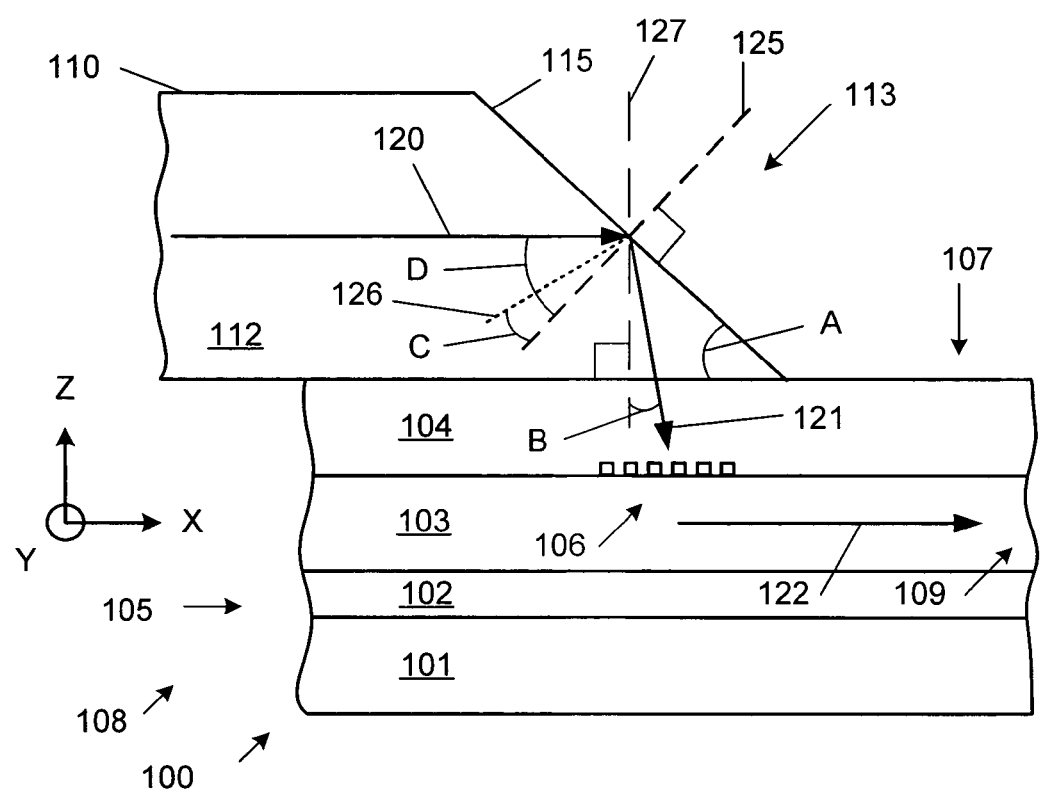
FIG. 2 is a side view of a fiber to chip coupler, according to one embodiment of the present invention.

FIG. 2 is a side view of a fiber to chip coupler, according to one embodiment of the present invention. Fiber to chip coupler (FTCC) 100 is made of optical fiber 110 positioned on the surface 107 of integrated circuit (chip) 108. Light 120 propagating in fiber 110 is reflected off surface 115 and is directed down as light 121. Line 125 is normal to the surface 115. Line 127 is normal to the surface 107 of chip 108. Angle A is the angle at which fiber 110 is cut to form angled tip 113 with surface 115. Angle B is the output angle of reflected light 121 with respect to the normal 127. Angle C is the critical angle with respect to the normal 125 to the surface 115. Angle D is the angle of incidence of light 120 with respect to the normal 125 to surface 115.

Surface 115 reflects light 120 down as light 121 due to the total internal reflection (TIR) at the fiber to air interface 115, if angle A is less than 45 degrees. According to Snell's law, light 120 impinging on dielectric interface 115 from the higher index side is totally reflected, if the angle of incidence is greater than the critical angle C, as expressed in equation 1.

$$C = \arcsin \frac{n(\text{air})}{n(\text{fiber})} \approx 43 \text{ degrees}, \quad (1)$$

where $n(\text{air}) = 1.0$ and $n(\text{fiber}) \approx 1.5$.

To achieve TIR, the angle of incidence D of the fiber modes has to be significantly larger than the critical angle C, where D is given by equation 2.

$$D = 90° - A \quad (2)$$

The relationship between angles D and G is given by equation 3:

$$D > C + G \quad (3)$$

Where G is the angle in glass corresponding to the numerical aperture (NA) of the fiber. For a typical SMF fiber, the numerical aperture NA=0.1 and G can be found using equation 4:

$$G = \arcsin \frac{NA}{n(\text{fiber})} \approx 4 \text{ degrees}, \quad (4)$$

Replacing D in equation 3 with its value from equation 2 and replacing for the values of C and G and then rewrite equation 3 as equation 5:

$$90° - A > 43° + 4° \quad (5)$$

And the result is that the cut angle A should be less than 43 degrees, for total internal reflection to take place at the inside of surface 115. The output angle B can be computed using equation 6:

$$B = 90° - 2A \quad (6)$$

For example, if the cut angle is 41 degrees, then the output angle B will be 8 degrees using equation 6.

Figure 3:
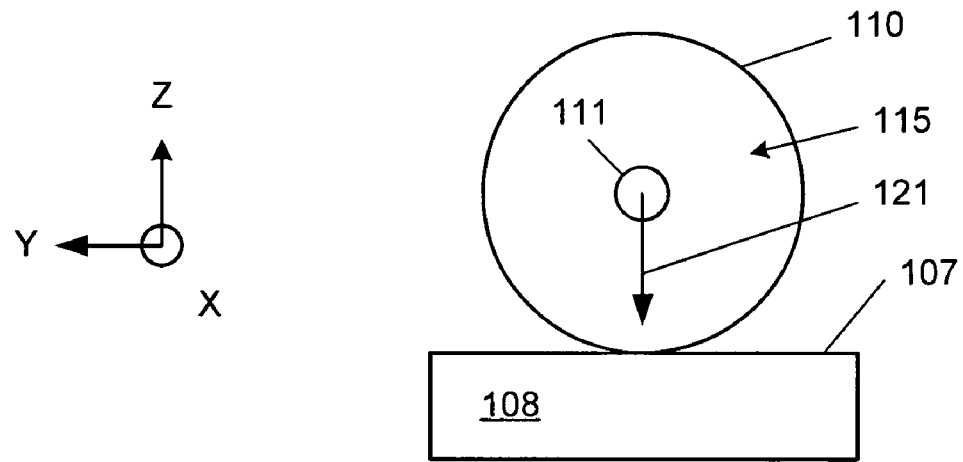
FIG. 3 is another view of a fiber to chip coupler, according to one embodiment of the present invention.

FIG. 3 is another view of a fiber to chip coupler, according to one embodiment of the present invention. In FIG. 3, fiber 110 is positioned on top of chip 108, looking at the fiber from the surface 115. The core 111 is surrounded by cladding 112. Light 121 reflected from surface 115 is directed down towards the chip 108. Light 121 is somewhat different from a typical fiber mode because it is slowly diverging. Light 121 is also astigmatic, because the cladding and air interface as seen in FIG. 3 forms a cylindrical lens. To reduce any loss experienced at the cladding to air and air to chip interfaces, an index matching material such as transparent epoxy can be used.

The light 121 has phasefronts that are distorted compared to the typically straight phasefronts of light propagating in a fiber that has been butt coupled to the surface of a chip. The general equation for the phase matching conditions for a waveguide grating coupler is given by equation 7:

$$\phi_G(x,y) = \phi_F(x,y) + 2m\pi \quad (7)$$

where $\phi_G$ is the guided wave phase map and $\phi_F$ is the fiber mode phase map. For different values of the integer m, the positions of the lines of a grating can be derived. For example, if a butt coupled fiber with a phase map given by equation 8 is coupled to a focusing guided wave given by equation 9;

$$\phi_F = k(0)n(\text{glass})\sin\theta x \quad (8)$$

$$\phi_G = \beta r \quad (9)$$

the solutions are given by ellipses. If the grating is defined by grooves, then the groves follow these ellipses. In equations 8 and 9: k(0) is the free space wavevector of light, n(glass) is the index of the glass covering the chip, θ is the angle of incidence of light with respect to the surface of the chip, β is the propagation constant in the planar waveguide and r is the in-plane radius in polar coordinates.

For a fiber 110 with an angled tip 113 as in the present invention, the phase map of the field incident on the grating can be solved numerically and injected into equation 7. Equation 7 can be solved to yield the grating lines, which can be distorted and chirped as compared to the elliptical solutions for the butt-coupled fiber. If the beam divergence is ignored, and a grating designed for a butt-coupled fiber is used, then the coupling loss may be higher, but the grating may still be usable.

Figure 4:
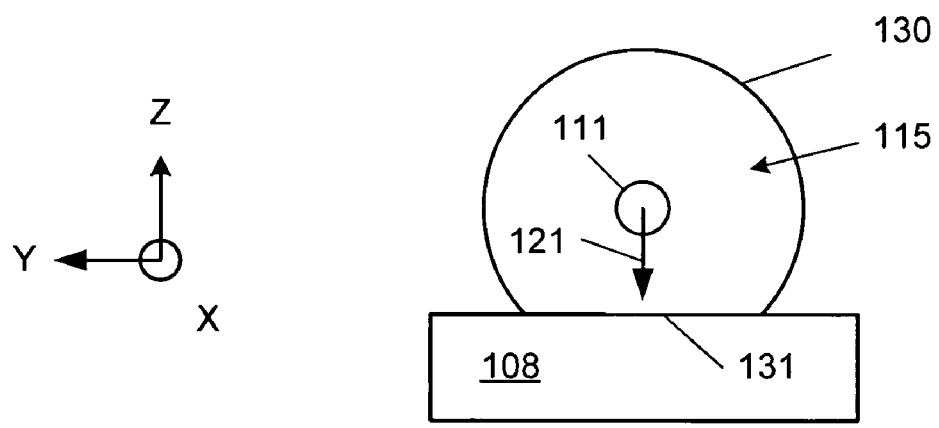
FIG. 4 is another view of a fiber to chip coupler, according to another embodiment of the present invention.

FIG. 4 is a view of a fiber to chip coupler, according to another embodiment of the present invention. In FIG. 4, fiber 130 is positioned on top of chip 108, looking at the fiber from the surface 115. The core 111 is surrounded by cladding 112 and the cladding has a flat area 131 which is on top of the surface of the chip 108. Light 121 reflected from surface 115 is directed down towards the chip 108. Light 121 is somewhat different from a typical fiber mode because it is slowly diverging. As compared to FIG. 3, light 121 in FIG. 4 is not astigmatic, because the cladding and air interface do not form a cylindrical lens, but have a flat interface as seen in FIG. 4. To reduce any loss experienced at the cladding to chip interface, an antireflective coating can be deposited on the fiber cladding and on the surface of the chip 108.

Figure 5:
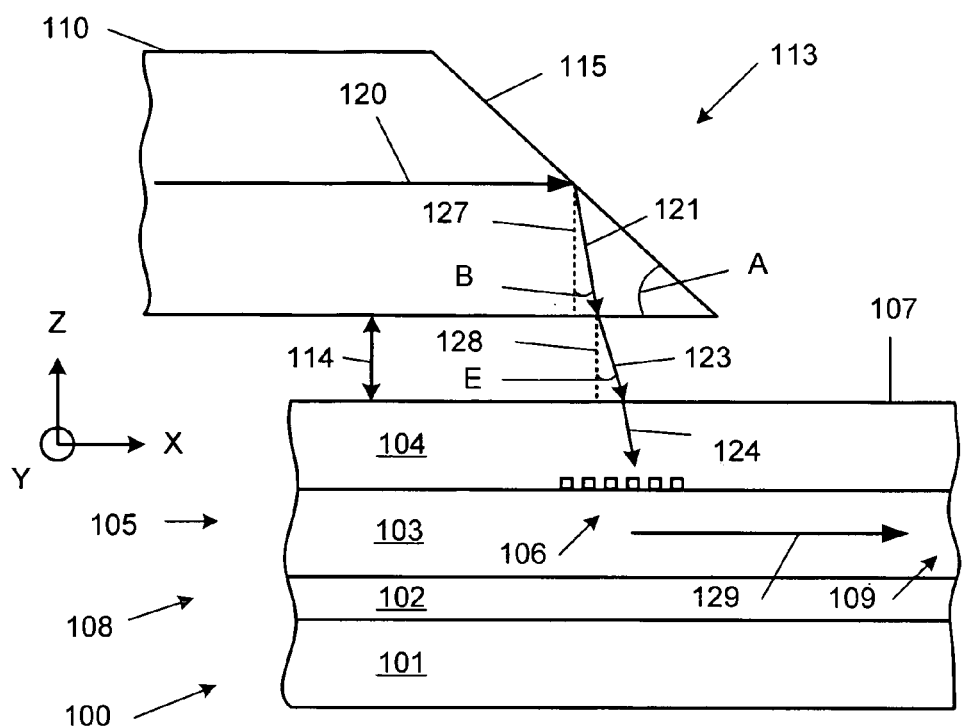
FIG. 5 is a side view of a fiber to chip coupler, according to an alternate embodiment of the present invention.

FIG. 5 is a side view of a fiber to chip coupler, according to an alternate embodiment of the present invention. FIG. 5 is similar to FIG. 1, except that there is an air gap 114 between the fiber 110 and the chip 108. The various similarly numbered elements of FIGS. 1 and 5 have similar characteristics and functions. Light 120 incident on surface 115 is reflected down as light 121 at an output angle B as was discussed with respect to FIG. 2. As light 121 reaches the cladding and air interface, there is a change in the angle of light 123, due to the change in refractive index. For example, the output angle B of 8 degrees with respect to the normal 127 corresponds to an angle E of 12 degrees with respect to the normal 128 in the layer of air 114 between the fiber and the chip. Normal 127 is orthogonal to the cladding and air interface and normal 128 is also orthogonal to the cladding and air interface but offset to the point of origin of light ray 124. To reduce any losses experienced at the cladding to air and air to chip interfaces, antireflective coatings can be deposited on the fiber cladding and on the surface of the chip 108. After light 124 has been received by scattering elements 106, the light 129 will be directed into waveguide 109 in chip 108.

After the grating 106 has been designed and fabricated, the fiber 110 has to be aligned above the grating 106. One way of aligning the fiber 110 to the grating 106 is to use an active alignment system by maximizing the light throughput from fiber to chip. The position of the fiber in the three axes x, y and z and the three angles $\theta(x)$, $\theta(y)$ and $\theta(z)$ can be optimized to achieve the best possible coupling. The alignment tolerances are similar to fiber to fiber coupling alignment. The x and y alignments are transverse ones with a small tolerance of typically less than 1 micron. The z axis alignment is longitudinal and more tolerant, such as 5 microns.

If the best possible transmission through the air gap 109 is desired, then the z axis tolerance is reduced to a smaller value. In such a situation the coupling loss is an oscillating function with z, with a periodicity of $\lambda/2/\cos B$, where $\lambda$ is the wavelength of light in use, such as $\lambda=1.55$ microns, and B is the output angle with respect to the normal as in FIG. 2, but in the air gap 114. To maintain a high point, the positioning accuracy needs to be better than $\lambda/4$. The tolerances for the angles depend on the specific geometric factors, for example $\theta(y)$ has to be controlled, so that the fiber 110 runs parallel to the chip 108. Light reflected back to fiber 110 from a reflective fixture can be used to align the position of the fiber in the three axes and three angles.

The fiber 110 can be held in a fixed position with respect to the chip 108 by bonding it with epoxy or by soldering the fiber. To prepare a fiber for soldering, a section of the cladding, that is not in the area of light transmission, can be metallized.

As an alternate way of bonding a fiber, the fiber 110 can be bonded or soldered to a pedestal, which is itself bonded or soldered to the chip or to a package that encloses the chip and the pedestal.

Another way of bonding fiber 110 to substrate 105 is to bond or solder fiber 110 to a connector, which is then bonded or soldered to the chip or to a package enclosing the chip.

If fiber 110 is bonded using epoxy and surface 115 is reflecting light by means of total internal reflection, then surface 115 cannot be coated with epoxy because epoxy has a refractive index which is similar to that of the fiber. If the fiber 110 and the epoxy have the same index of refraction, then there is no index contrast and no reflection at surface 115. But if surface 115 is coated with a reflective metal, then the angled tip 113, including the surface 115 can be coated with epoxy.

When the chip 108 and the optional pedestal are enclosed in a package, the fiber 110 can be fed into the package from the exterior. During the alignment and attachment procedure, a 'gripper' can be used to hold the tip of the fiber 110 inside the package and orient it correctly. The gripper is a robot that can move in all directions and rotate the fiber, as needed. Alternatively, the fixture that holds the fiber 110 outside of the package and that feeds the fiber into the package can be used by a robot to perform the alignment. After completion of the fiber alignment and attachment process, a section of metallized fiber cladding, which is sufficiently far enough from the angled tip, can be soldered to provide hermetic sealing of the fiber feedthrough.

To align and attach multiple fibers, each of the fibers can be aligned to one pedestal with, for example, multiple grooves, which is then attached to an integrated circuit.

A particularly advantageous aspect of the present invention is that the present invention provides an efficient, economical and space spacing coupling between optical fibers and integrated circuits.

Although the present invention has been described in detail, it should be understood that various changes, substitutions and alterations can be made without departing from the spirit and scope of the invention.

We claim:

1. An apparatus for optically coupling light between an optical fiber and a substrate, comprising:
   a waveguide grating coupler disposed on the substrate and
   an optical fiber comprising: a core and a cladding, with an angled tip,
   where the angled tip of the fiber:
      is positioned on the surface of a substrate with the core of the fiber substantially parallel to the surface of the substrate, and the cladding on the longer side of the angled tip is adjacent to the surface of the substrate, and
      has a reflective surface with an angle of less than 45 degrees to the surface of the substrate, and the reflective surface is positioned adjacent to the waveguide grating coupler disposed on the substrate.

2. An apparatus according to claim 1, wherein the reflection of light at the reflective surface is substantially total internal reflection.

3. An apparatus according to claim 1, and further comprising a coating on the exterior of the reflective surface, where the material comprising the coating is selected from one of the following: a dielectric, a plurality of dielectric layers, epoxy, a metal and a first layer comprised of metal and a second layer comprised of epoxy.

4. An apparatus according to claim 3, wherein the metal is selected from one of the following: aluminum and gold.

5. An apparatus according to claim 1, wherein the shape of the reflective surface is substantially flat.

6. An apparatus according to claim 1, wherein light reflecting off the reflective surface and propagating to the substrate is a diverging beam of light.

7. An apparatus according to claim 1, wherein light propagating from the waveguide grating coupler to the reflective surface is a converging beam of light.

8. An apparatus according to claim 1, wherein the waveguide grating coupler couples light between the fiber and a planar waveguide disposed on the substrate.

9. An apparatus according to claim 1, and further comprising a flat section on the cladding adjacent to the angled tip of the fiber, where the flat section:
   is oriented parallel to the core of the fiber,
   is positioned on the longer side of the angled tip,
   is aligned adjacent to and on top of the waveguide grating coupler, and
   is positioned in substantial contact with the surface of the substrate.

10. An apparatus according to claim 9, wherein the flat section forms a stigmatic lens in the optical path between the reflective surface of the angled tip of the fiber and the surface of the substrate.

11. An apparatus according to claim 1, and further comprising mechanical bonding of the fiber to the substrate with epoxy.

12. An apparatus according to claim 1, and further comprising mechanical bonding of the fiber to a pedestal with epoxy.

13. An apparatus according to claim 12, and further comprising mechanical bonding of the pedestal to the substrate with epoxy.

14. An apparatus according to claim 1, and further comprising bonding of the fiber to a connector with one of the following: a mechanical bond and epoxy.

15. An apparatus according to claim 14, and further comprising bonding of the connector by one of the following:
   using epoxy to bond the connector to the substrate,
   using epoxy to bond the connector to a package enclosing the substrate,
   using solder to bond the connector to the substrate,
   using solder to bond the connector to a package enclosing the substrate,
   using a mechanical bond to bond the connector to the substrate and
   using a mechanical bond to bond the connector to a package enclosing the substrate.

16. An apparatus according to claim 1, and further comprising a metallic coating applied to a section of the cladding of the fiber, where the metallized section of the cladding is not in the optical path of light propagating between the reflective surface and the substrate.

17. An apparatus according to claim 16, and further comprising mechanical bonding of the metallized section of the cladding of the fiber to the substrate with solder.

18. An apparatus according to claim 16, and further comprising mechanical bonding of the metallized section of the cladding of the fiber to a pedestal with solder.

19. An apparatus according to claim 18, and further comprising mechanical bonding of the pedestal to the substrate with a material selected from one of the following: epoxy and solder.

20. An apparatus according to claim 1, and further comprising an active alignment system for the alignment of the angled tip of the fiber to the waveguide grating coupler on the substrate wherein said coupled light is monitored.

21. An apparatus according to claim 20, and further comprising an active alignment system for the alignment of the angled tip of the fiber in the longitudinal direction of the fiber to the waveguide grating coupler on the substrate wherein the alignment is better than ±five microns.

22. An apparatus according to claim 20, and further comprising an active alignment system for the alignment of the angled tip of the fiber in the lateral direction of the fiber to the waveguide grating coupler on the substrate wherein the alignment is better than ±two microns.

23. An apparatus according to claim 20, and further comprising an active alignment system for the alignment of the angled tip of the fiber with respect to the height of the fiber above the waveguide grating coupler on the substrate wherein the height of the fiber above said waveguide grating coupler is less than about five microns.

24. An apparatus according to claim 1, wherein said optical fiber is selected from one of the following: a single mode fiber and a polarization maintaining fiber and wherein said optical fiber is positioned less than about five microns from said waveguide grating coupler.

25. An apparatus according to claim 1, wherein said optical fiber is a polarization maintaining fiber (PMF) with a mode polarized parallel to the surface of the substrate and wherein said optical fiber is positioned less than about five microns from said waveguide grating coupler.

26. An apparatus according to claim 1, wherein the substrate is selected from the group comprising: silicon, silicon on insulator (SOI), silicon on sapphire (SOS), silicon on nothing (SON) and
   a first layer of monocrystalline silicon,
   a second layer of dielectric material disposed on the first layer,
   a third layer of monocrystalline silicon disposed on the second layer,
   a fourth layer of dielectric material disposed on the third layer,
   a fifth layer of monocrystalline silicon disposed on the fourth layer.

27. A method of fabricating an apparatus for coupling light between an optical fiber and a waveguide grating coupler disposed on a substrate, comprising:
   forming an angled tip with a reflective surface on the fiber by cutting the fiber at an angle of less than 45 degrees with respect to the core of the fiber,
   positioning the longer side of the angled tip of the fiber on top and adjacent to the waveguide grating coupler, and
   bonding the angled tip of the fiber to the substrate.

28. The method of claim 27, wherein forming the angled tip further comprises:
   flattening the reflective surface by polishing the reflective surface, after the fiber has been cut.

29. The method of claim 27, wherein forming the angled tip further comprises:
   coating the reflective surface with a coating, after the fiber has been cut, where the coating is selected from one of the following: a dielectric, a plurality of dielectric layers, epoxy, a metal and a first layer comprised of metal and a second layer comprised of epoxy.

30. The method of claim 27, wherein positioning further comprises:
   propagating a light through the optical fiber towards the reflective surface, and
   aligning the angled tip of the fiber with respect to the waveguide grating coupler by
   maximizing the amount of light coupled from the reflective surface through the waveguide grating coupler.

31. The method of claim 27, wherein positioning further comprises:
   propagating a light through the waveguide grating coupler towards the reflective surface, and aligning the angled tip of the fiber with respect to the waveguide grating coupler by maximizing the amount of light coupled to the optical fiber through the reflective surface.

32. The method of claim 27, wherein bonding further comprises:
using epoxy to bond the angled tip of the fiber to the substrate.

33. The method of claim 27, wherein bonding further comprises:
using epoxy to bond the angled tip of the fiber to a pedestal and
using epoxy to bond the pedestal to the substrate.

34. The method of claim 27, wherein bonding further comprises:
bonding the angled tip of the fiber to a connector using one of the following: epoxy, solder and a mechanical bond and
bonding the connector to the substrate using one of the following: epoxy, solder and a mechanical bond.

35. The method of claim 27, wherein bonding further comprises:
bonding the angled tip of the fiber to a connector using one of the following: epoxy, solder and a mechanical bond and
bonding the connector to a package enclosing the substrate using one of the following: epoxy, solder and a mechanical bond.

36. The method of claim 27, wherein bonding further comprises:
applying a metal coating to a section of the cladding of the fiber, where the metallized section of the cladding is not in the optical path of light propagating between the reflective surface and the waveguide grating coupler disposed on the substrate, and
bonding the metallized section of fiber to the substrate with solder.

37. The method of claim 27, wherein bonding further comprises:
applying a metal coating to a section of the cladding of the fiber, where the metallized section of the cladding is not in the optical path of light propagating between the reflective surface and the waveguide grating coupler disposed on the substrate, bonding the metallized section of fiber to a pedestal with solder, and
bonding the pedestal to the substrate with a material selected from one of the following: epoxy and solder.

38. The method of claim 27, wherein bonding further comprises:
forming a flat section on the cladding adjacent to the angled tip of the fiber, where the flat section is on the longer side of the angled tip, and the flat section is oriented parallel to the core of the fiber,
aligning the flat section adjacent to and on top of the waveguide grating coupler,
positioning the flat section in substantial contact with the surface of the substrate, and
bonding the planar section to the substrate with epoxy.

39. The method of claim 27, wherein said optical fiber is a polarization
maintaining fiber (PMF) and forming the angled tip further comprises:
selecting the mode of the PMF to be propagated through the apparatus, where the selected mode is polarized parallel to the surface of the substrate,
forming the angled tip with a reflective surface on the fiber by cutting the fiber at an angle of less than 45 degrees with respect to the plane of the selected mode, and positioning said optical fiber less than about five microns from said waveguide grating coupler.

* * * * *